United States Patent
Hazzard et al.

(10) Patent No.: US 10,428,972 B2
(45) Date of Patent: Oct. 1, 2019

(54) WATER HEATER GAS VALVE

(71) Applicant: Ademco Inc., Golden Valley, MN (US)

(72) Inventors: Frederick Hazzard, Plymouth, MN (US); David Heil, Robbinsdale, MN (US); Ravindra Khosla, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 44 days.

(21) Appl. No.: 15/717,608

(22) Filed: Sep. 27, 2017

(65) Prior Publication Data

US 2019/0093787 A1  Mar. 28, 2019

(51) Int. Cl.
*F16K 31/128* (2006.01)
*F16K 7/17* (2006.01)
*F16K 31/126* (2006.01)

(52) U.S. Cl.
CPC .............. *F16K 31/128* (2013.01); *F16K 7/17* (2013.01); *F16K 31/1268* (2013.01); *Y10T 137/87917* (2015.04)

(58) Field of Classification Search
CPC ... F16K 31/128; F16K 31/1268; G05D 16/06; Y10T 137/87917
USPC .......................... 137/485, 486, 488, 613, 510
See application file for complete search history.

(56) References Cited

U.S. PATENT DOCUMENTS

| | | |
|---|---|---|
| 2,009,193 A | 7/1935 | Hegwein et al. |
| 2,268,959 A | 1/1942 | Ray |
| 2,390,192 A | 12/1945 | St. Clair |
| 2,411,230 A | 11/1946 | Ray |
| 2,437,894 A | 3/1948 | Ray |
| 2,442,145 A | 5/1948 | Ray |
| 2,446,718 A | 8/1948 | Ray |
| 2,456,147 A | 12/1948 | Ray |
| 2,494,833 A | 1/1950 | Ray |
| 2,512,173 A | 6/1950 | Ray |
| 2,529,740 A | 11/1950 | Ray |
| 2,533,625 A | 12/1950 | Ray |
| 2,601,321 A | 6/1952 | Ray |
| 2,615,511 A | 10/1952 | Ray |
| 2,652,109 A | 9/1953 | Ray |
| 2,753,931 A | 7/1956 | Ray |
| 2,850,030 A | 9/1958 | Guelson |
| 2,939,523 A | 6/1960 | Ray |
| 3,151,660 A | 10/1964 | Evraets |
| 3,360,198 A | 12/1967 | Katchka |
| 3,373,765 A | 3/1968 | McCarty |
| 3,414,010 A | 12/1968 | Sparrow |
| 3,433,409 A | 3/1969 | Jackson et al. |
| 3,552,430 A | 1/1971 | Love |

(Continued)

FOREIGN PATENT DOCUMENTS

EP  1170549 B1  11/2006

OTHER PUBLICATIONS http://www.solarwaterheatingindia.comsunonn.html, "SunOnn Storage Gas Water Heater," 2 pages, printed Jul. 26, 2016.

*Primary Examiner* — Kevin L Lee
(74) *Attorney, Agent, or Firm* — Shumaker & Sieffert, P.A.

(57) ABSTRACT

A gas valve assembly configured to operate without a pilot assembly is disclosed. In an illustrative embodiment, a servo valve actuates a diaphragm valve to selectively allow for fluid coupling of a gas inlet and gas outlet. The diaphragm valve may be a normally closed valve that opens in response to a pneumatic force resulting from the opening of the servo valve.

18 Claims, 8 Drawing Sheets

(56) References Cited

U.S. PATENT DOCUMENTS

| | | | |
|---|---|---|---|
| 3,592,225 A | 7/1971 | Graham et al. | |
| 3,666,173 A | 5/1972 | Ray | |
| 3,688,981 A | 9/1972 | Sidaris | |
| 3,809,313 A | 5/1974 | Branson | |
| 3,973,576 A | 8/1976 | Dietiker et al. | |
| 4,303,384 A | 12/1981 | Barnes | |
| 4,413,975 A | 11/1983 | Turner et al. | |
| 4,622,999 A | 11/1986 | Ray | |
| 4,624,632 A | 11/1986 | Barnes et al. | |
| 4,696,639 A | 9/1987 | Bohan, Jr. | |
| 4,832,070 A | 5/1989 | James et al. | |
| 4,850,530 A | 7/1989 | Uecker | |
| 5,203,688 A | 4/1993 | Dietiker | |
| 5,407,128 A | 4/1995 | Schultz | |
| 5,503,549 A | 4/1996 | Iasella | |
| 6,032,693 A | 3/2000 | Home | |
| 6,192,913 B1 | 2/2001 | Willey et al. | |
| 6,418,956 B1 * | 7/2002 | Bloom | G05D 16/185 137/14 |
| 6,637,669 B2 | 10/2003 | Areso | |
| 6,705,342 B2 | 3/2004 | Santinanavat et al. | |
| 6,932,101 B2 | 8/2005 | Home | |
| 7,066,203 B2 * | 6/2006 | Baarda | F23N 1/005 137/488 |
| 7,222,639 B2 | 5/2007 | Bonne et al. | |
| 7,252,502 B2 | 8/2007 | Munsterhuis | |
| 7,435,081 B2 | 10/2008 | Munsterhuis | |
| 7,523,762 B2 | 4/2009 | Buezis et al. | |
| 8,162,002 B2 * | 4/2012 | Pavin et al. | F23N 1/005 137/489.5 |
| 8,479,759 B2 * | 7/2013 | Benvenuto et al. | F23N 1/005 137/65 |
| 2004/0075070 A1 | 4/2004 | Munsterhuis | |
| 2004/0173600 A1 | 9/2004 | Munsterhuis et al. | |
| 2004/0176859 A1 | 9/2004 | Chian et al. | |
| 2004/0200530 A1 | 10/2004 | Dalton et al. | |
| 2005/0041437 A1 | 2/2005 | Chian et al. | |
| 2005/0161516 A1 | 7/2005 | Munsterhuis | |
| 2005/0161518 A1 | 7/2005 | Munsterhuis | |
| 2006/0137749 A1 | 6/2006 | Bonne et al. | |
| 2007/0221276 A1 | 9/2007 | Buezis et al. | |
| 2014/0007821 A1 | 1/2014 | Villalobos et al. | |

* cited by examiner

WATER HEATER GAS VALVE

TECHNICAL FIELD

The disclosure relates generally to gas valve assemblies, and more particularly, to a pilot-less gas valve assembly.

BACKGROUND

Water heaters are used in homes, businesses and in just about any establishment having the need for heated water. A conventional water heater typically has at least one heating element or "heater," such as a gas-fired burner and/or electric heating element. Gas-powered appliances typically have some control system included for controlling the operation of the appliance. In this context, a gas-powered appliance may be a water heater, a fireplace insert, a furnace, a gas stove, or any other gas-powered appliance. Also in this context, "gas-powered" typically means that natural gas or liquid propane gas is used as a primary fuel source, but it should be recognized that "gas-powered" may also include any other suitable fuel source either in a liquid or gaseous state, as desired.

In the case of a gas-fired burner, a redundant gas valve is typically provided to control the flow of gas to the burner. In warmer climates, water heaters may be located outside the home. A manual gas valve may be manually turned on, and the burner may be manually lit once or twice a day as needed (or on demand). In this case, the manual gas valve may function as a redundant gas valve. Also, a pilot system is not required. What would be desirable is an economical robust gas valve that is suitable for such manually actuated lower demand systems.

SUMMARY

The disclosure relates generally to gas valve assemblies, and more particularly, to a pilot-less gas valve assembly. While water heaters are described below as one example application, it should be recognized that there are many other applications where it may be desirable to manually control a burner without a pilot system.

An illustrative, but non-limiting example of the disclosure may be found in a gas valve assembly that includes a gas inlet, a gas outlet, and a gas fluid path defined between the gas inlet and the gas outlet. A first valve seat may be situated in the gas fluid path between the gas inlet and the gas outlet. A second valve seat may be situated in the gas fluid path between the gas inlet and the gas outlet in series with the first valve seat. A first diaphragm valve may be configured to be responsive to one or more pneumatic pressures to move between a closed position where the first diaphragm valve is sealed against the first valve seat and an open position wherein the first diaphragm valve is spaced away from the first valve seat and opening the gas fluid path. The first diaphragm valve may be biased toward the closed position by a spring. A second diaphragm valve may be positioned adjacent the second valve seat wherein the second diaphragm valve is spaced away from the second valve seat. The second diaphragm valve may be free from being biased toward the second valve seat by a spring. A servo valve, when activated, may control one or more pneumatic paths to move the first diaphragm valve away from the first valve seat and to allow a flow of gas along the gas fluid path between the gas inlet and the gas outlet.

Another example of the disclosure may be found in a gas valve assembly that includes a single piece housing defining a gas inlet, a gas outlet, a first valve seat between the gas inlet and the gas outlet and a second valve seat between the gas inlet and the gas outlet in series with the first valve seat. The gas valve assembly may include a first diaphragm valve configured to be responsive to one or more pneumatic pressures to move between a closed position where the first diaphragm valve is sealed against the first valve seat and an open position wherein the first diaphragm valve is pulled away from the first valve seat. A servo valve may be provided that controls one or more pneumatic paths to move the first diaphragm valve away from the first valve seat and to allow a flow of gas between the gas inlet and the gas outlet. The gas inlet and the gas outlet may be fluidly isolated from one another except when the first diaphragm valve is in the open position.

Another example of the disclosure may be found in a gas valve assembly that includes a gas inlet, a gas outlet, a gas fluid path defined between the gas inlet and the gas outlet where the gas fluid path has a first flow chamber and a second flow chamber; a first valve seat situated in the gas fluid path between the gas inlet and the gas outlet, a first diaphragm valve configured to be responsive to one or more pneumatic pressures to move between a normally closed position where the first diaphragm valve is sealed against the first valve seat and an open position wherein the first diaphragm valve is pulled away from the first valve seat, a servo valve that, when activated, controls the one or more pneumatic paths to move the first diaphragm valve away from the first valve seat and to allow a flow of gas between the gas inlet and the gas outlet, where the gas inlet and the gas outlet are fluidly isolated from one another at all times except when the first diaphragm valve is in the open position.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular illustrative embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

Figure 1:
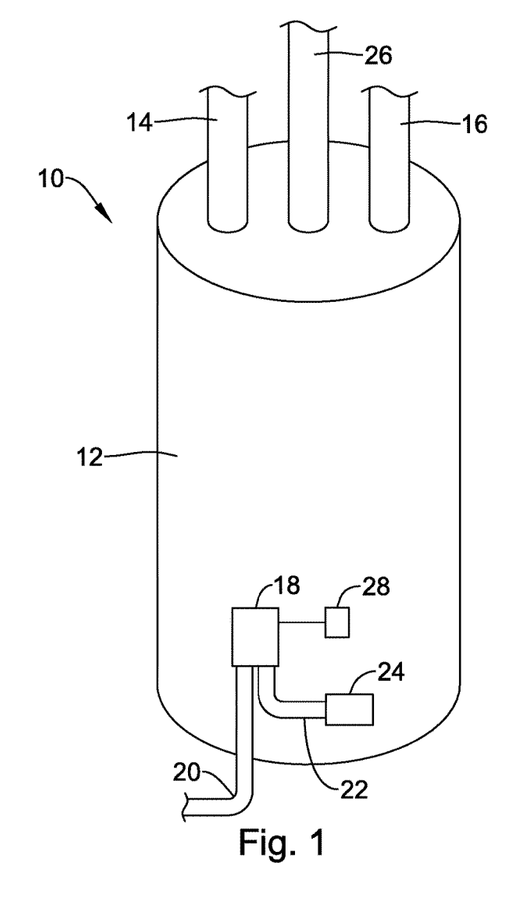
FIG. 1 is a schematic view of an illustrative but non-limiting water heater in accordance with the present disclosure.

FIG. 1 provides a schematic view of an illustrative but non-limiting water heater 10. While a water heater is described as one example application, it should be recognized that there are many other applications for the gas valves discussed below in subsequent Figures. The illustrative water heater 10 includes a water heater tank 12. The water heater tank 12 may include an insulating layer (not explicitly shown) positioned about the water heater tank 12 to help reduce thermal losses from the water heater tank 12. Cold water enters water heater tank 12 through a cold water line 14 and is heated by a gas burner 24. In some cases, the water heater 10 may include an electric heating element rather than a gas burner 24. A power delivery unit (not shown) may be used to selectively apply power (i.e. current) to the electric heating element. In either case, the resulting heated water exits through a hot water line 16. For gas-fired water heaters, a gas control unit 18, such as a gas valve, regulates gas flow from a gas source 20 through a combustion gas line 22 and into gas burner 24. A flue 26 permits combustion byproducts to safely exit.

As can be seen, water heater 10 may include a temperature sensor 28. In some cases, temperature sensor 28 may enter water heater tank 12 at a location laterally and/or vertically offset from gas control unit 18. In some instances, however, temperature sensor 28 may instead be located behind gas control unit 18, and in some cases, may be supported and retained by a common mounting bracket. In some embodiments, a non-immersion type temperature sensor may be provided.

Figure 2:
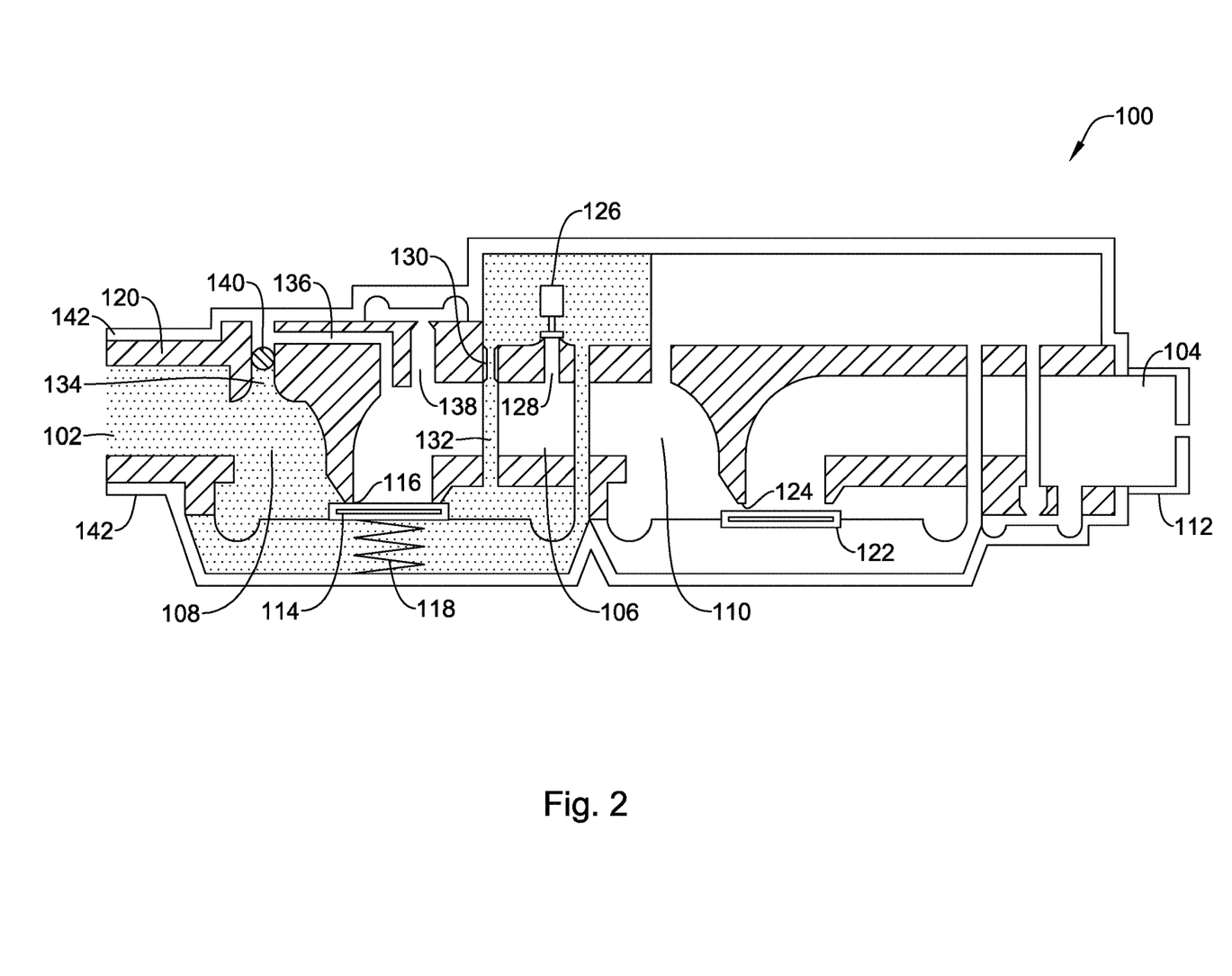
FIG. 2 is a schematic cross-sectional view of an illustrative gas valve in an off position.

FIG. 2 is a schematic cross-sectional view of an illustrative, but non-limiting gas valve 100, in a closed or off configuration. The illustrative gas valve 100 includes a valve body 120 that has a gas inlet 102, a gas outlet 104, and a conduit 106 connecting the gas inlet 102 and a gas outlet 104. The valve body 120 may be a single piece molded or cast structure, although this is not required. The conduit 106 can include any number of flow chambers. However, in the illustrative embodiment shown, the conduit 106 includes a first flow chamber 108 and a second flow chamber 110. The first flow chamber 108 is in fluid communication with the gas inlet 102. The second flow chamber 110 is in fluid communication with the gas outlet 104. The second flow chamber 110 can be in selective fluid communication with the first flow chamber 108, as further described below. The gas outlet 104 may be configured to connect gas burner of a water heater or other appliance via a coupling 112. The illustrative gas valve 100 of FIG. 2 may be free from a pressure regulator.

A first valve 114 is disposed between the first flow chamber 108 and the second flow chamber 110. In the illustrative embodiment, the first valve 114 is a diaphragm valve with a resilient spring 118 biasing the first valve 114 towards a first valve seat 116 and causing the first valve 114 to be a normally closed valve. A second valve 122 is disposed in the second flow chamber 110 downstream from the first valve 114 such that the first and second valves 114, 122 are in series with one another. In the illustrative embodiment, the second valve 122 is a diaphragm valve free from or lacking a resilient spring causing the second valve 122 to be spaced a distance from an adjacent second valve seat 124 and in an open position. The lack of a biasing element or spring may cause the second valve 122 to remain open or to be a normally open valve. While the gas valve 100 is illustrated as including a second valve 122 and diaphragm coupled to the second valve 122, it is contemplated that the second valve 122 and/or diaphragm may not be present.

The first valve 114 can open and close to control gas flow from the first flow chamber 108 to the second flow chamber 110, and thus from the gas inlet 102 and the gas outlet 104. In some cases, the first valve 114 may be controlled by an electronic servo valve 126. The electronic servo valve 126 may control one or more pneumatic pressure paths that cause the first valve 114 to move away from the first valve seat 116 and to the open position. However, other means of controlling the opening and/or closing of the first valve 114 are contemplated. The underside of the first valve 114 may be in fluid communication with the gas inlet 102. The pressure of the gas underneath the first valve 114 may help (e.g., in combination with resilient spring 118) maintain the first valve 114 sealed against the first valve seat 116 when the gas valve 100 is off or no gas flow is desired. As can be seen in FIG. 2, when no gas flow is desired, the gas is confined to the first flow chamber 108.

The illustrative gas valve 100 is free from o a pilot light system. In such an instance, a spark igniter (piezoelectric or automatic sparker) may be positioned in the main burner. In a low power environment (e.g., in the range of 10,000 BTU/hour or less), spark ignition may be sufficient to ignite the main burner. A thermopile may be used to generate power to operate the control of the water heater, and may be positioned directly in the main burner. In some instances, it may take the thermopile a length of time (e.g., in the range of 15 to 45 seconds) to heat sufficiently to power the control. As such it may be desirable, but not required, to provide the controller with a power source, such as a battery or super capacitor, that can keep the electronic servo valve 126 energized while the thermopile heats up. If such a power source is included in the control, then the user need not wait until the thermopile heats up for the control to work.

When the controller is provided with a power source, a power switch and/or button may be added to turn on the controller during ignition and thermopile heat-up. In some cases, this switch/button may be a momentary contact switch. Subsequently, the thermopile could provide the control power and would keep the control on until the end of the water heating cycle. At the end of the heating cycle, the control could shut down without user intervention.

In some cases, once the power switch has activated the control, a visual display on the controller, such as, but not limited to a light emitting diode (LED) may be configured to flash a certain pattern or color to indicate the control has been activated. Once the burner has lit, the thermopile voltage will start to increase, and within a few seconds, but in much less time than needed to power the control, the thermopile voltage could be detected and the LED could flash another pattern or change color to indicate a successful ignition of the burner. In some embodiments, the controller power source could be, but would not be required to be, rechargeable and the controller could recharge it from the thermopile. In the case where a battery is used, battery life could be maximized by using a switching circuit to provide only the current needed to operate the control and the electronic servo valve 126. It is further contemplated that a similar switching circuit may be used to optimize the efficiency of energy stored in a super capacitor (if so provided). The capacitor would only be charged to the necessary charge to power the control and/or the electronic servo valve 126 while the thermopile heats up, plus a safety margin.

When gas flow is desired (e.g., heat to the water heater is called for), a controller may actuate the electronic servo valve 126 to cause the electronic servo valve 126 to open. In some cases, a user may manually actuate the electronic servo valve 126 through a button or the like to cause the electronic servo valve 126 to open. Once the electronic servo valve 126 is open, gas may begin to flow into the second flow chamber 110 through a now open channel 128. A restrictor 130 may be provided in one or more channels, such as channel 132, to reduce the flow of gas in a particular flow direction. As the gas begins to flow into the second flow chamber 110, the pressure on top of the first valve 114 may become greater than the pressure underneath the first valve 114. Once the pressure on top of the first valve 114 increases above the combined force provided by the resilient spring 118 and the pressure underneath the first valve 114, the first valve 114 will move away from the first valve seat 116 under a pneumatic pressure, and allow for a flow of gas from the first flow chamber 108 to the second flow chamber 110, as shown in FIG. 3.

In some cases, the gas valve 100 may be provided with one or more structures that are configured to allow for the use of a pilot assembly. For example, the gas valve 100 may be provided with a first pilot channel 134 configured to receive a manual pilot valve. When so provided, a manual pilot valve may selectively direct a flow of gas from the first flow chamber 108, through a pilot by-pass channel 136. The pilot by-pass channel 136 may connect a flow of gas to a pilot pressure regulator (not explicitly shown) through a second pilot channel 138. While not explicitly shown, the pilot pressure regulator may control a flow of gas to a pilot outlet operably coupled to a pilot burner. A ball bearing 140 or other plug may be inserted into the first pilot channel 134 to substantially block the first pilot channel 134 when a pilot assembly is not used. A continuous sealing material or gasket 142, such as, but not limited to a rubber material, may be placed over the entire outer surface of the valve body 120. The sealing material or gasket 142 may block any openings in the gas valve 100 that may allow gas to leak through in the absence of a pilot assembly and the structure required to control a flow gas to said pilot assembly.

Figure 3:
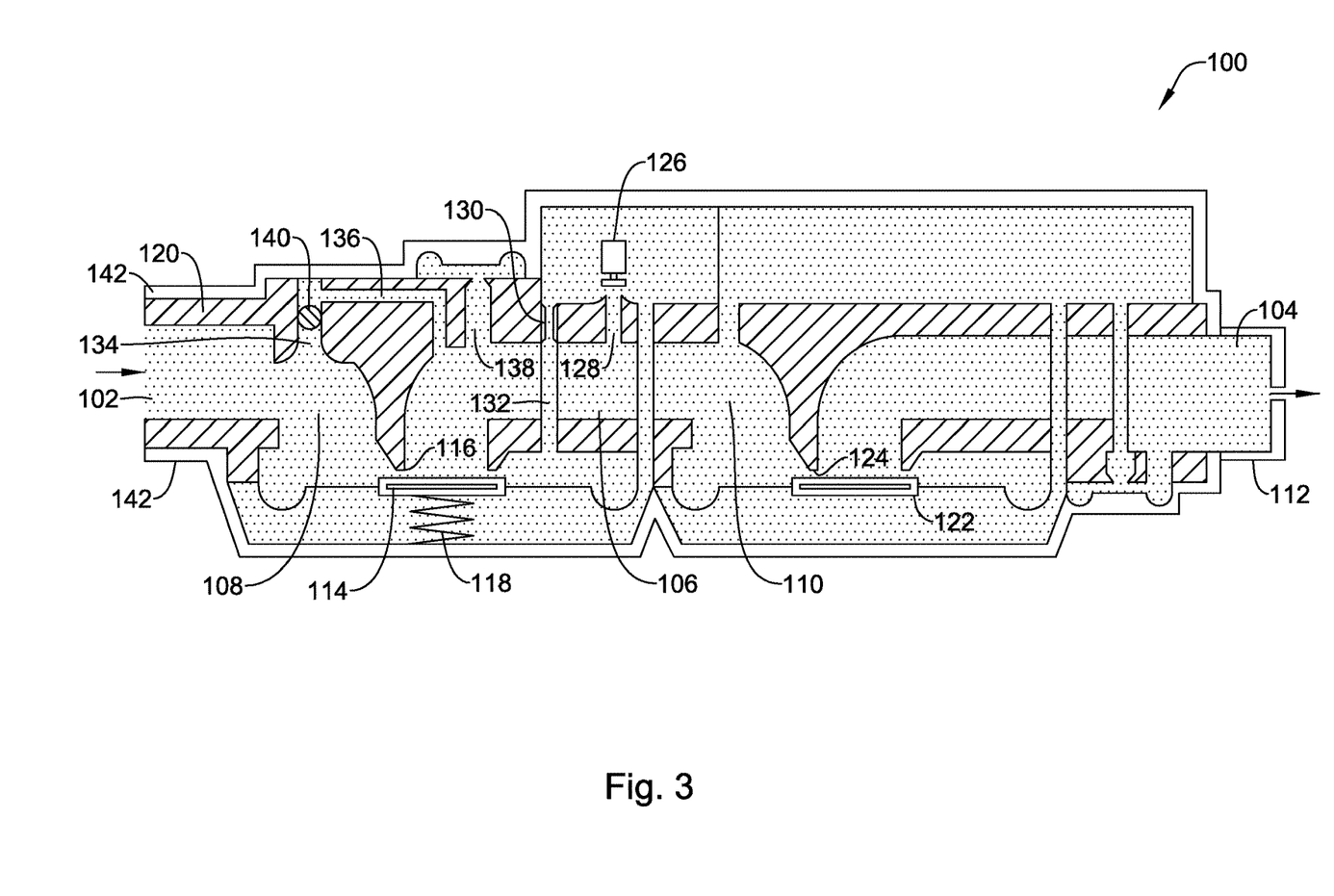
FIG. 3 is a schematic cross-sectional view of the illustrative gas valve of FIG. 2 in an on position.

As can be seen, the valve assembly of FIGS. 2 and 3 may include a single blocking valve (e.g., first valve 114). It is contemplated that the gas valve 100 may be used in a manually actuated system. In such a system, a user typically is required to open a manual gas valve connected to a propane tank (or other fuel source) upstream of the gas inlet 102. This manual gas valve acts as a first blocking valve (redundant valve), and the first valve 114 of the gas valve 100 acts as the second blocking valve to provide a redundant valve system.

Figure 4:
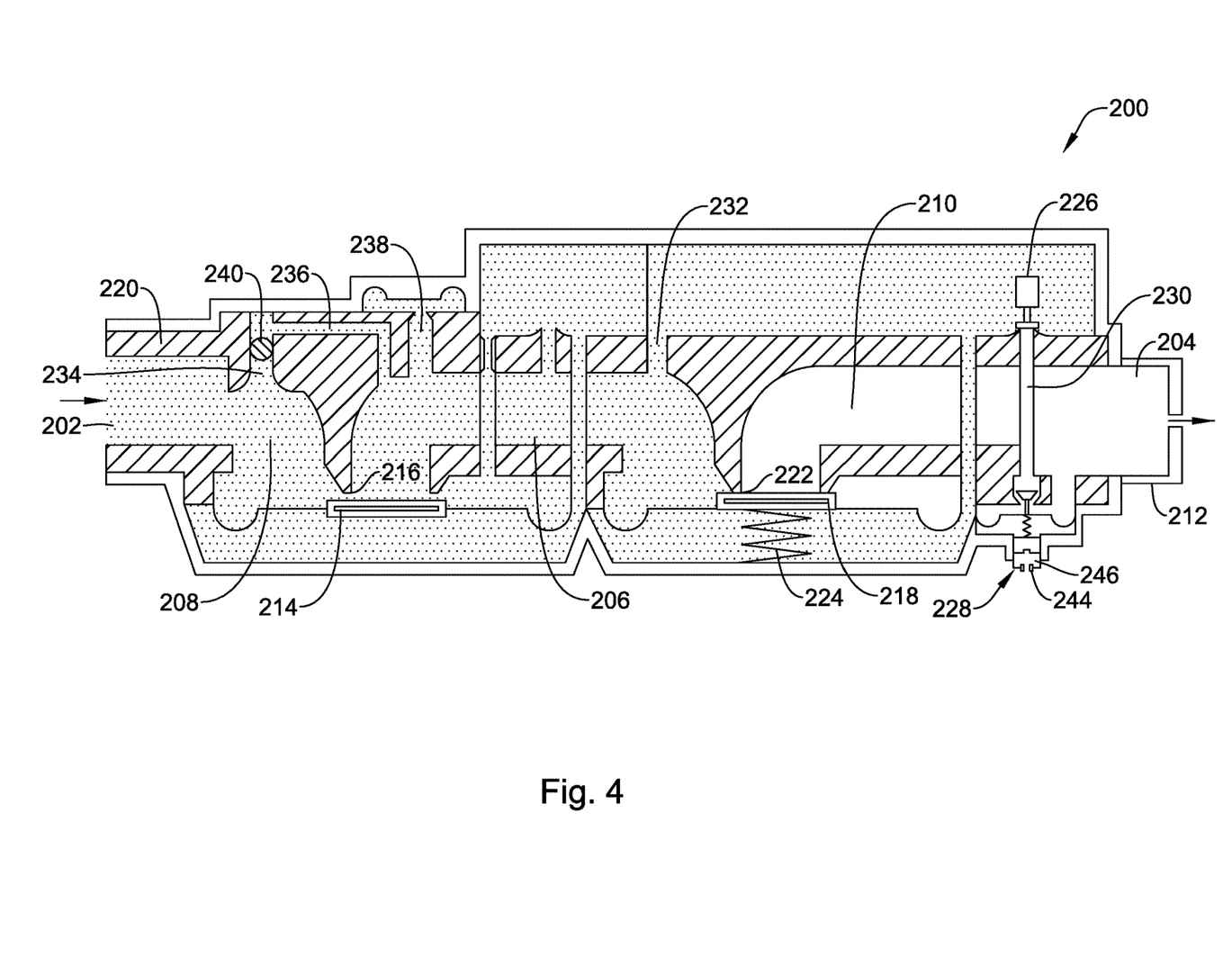
FIG. 4 is a schematic cross-sectional view of another illustrative gas valve in an off position.

FIG. 4 is a schematic cross-sectional view of another illustrative, but non-limiting gas valve 200, in a closed or off configuration. The illustrative gas valve 200 includes a valve body 220 that has a gas inlet 202, a gas outlet 204, and a conduit 206 connecting the gas inlet 202 and gas outlet 204. The valve body 220 may be a single piece molded or cast structure, although this is not required. The conduit 206 can include any number of flow chambers. However, in the illustrative embodiment shown, the conduit 206 includes a first flow chamber 208 and a second flow chamber 210. The first flow chamber 208 is in fluid communication with the gas inlet 202. The second flow chamber 210 is in fluid communication with the gas outlet 204. The second flow chamber 210 can be in selective fluid communication with the first flow chamber 208, as further described below. The gas outlet 204 may be configured to connect to a gas burner via a coupling 212.

A first valve 214 is disposed between the first flow chamber 208 and the second flow chamber 210. In the illustrative embodiment, the first valve 214 is a diaphragm valve free from or lacking a resilient spring causing the first valve 214 to be spaced a distance from an adjacent first valve seat 116 and in the open position. The lack of a biasing element or spring may cause the first valve 214 to remain open or to be a normally open valve. While the gas valve 200 is illustrated as including the first valve 214 and diaphragm coupled to the first valve 214, it is contemplated that the first valve 214 and/or diaphragm may not be present.

A second valve 218 is positioned between the first flow chamber 208 and the second flow chamber 210 such that the first and second valves 214, 218 are in series with one another. In the example shown, the second valve 218 is a diaphragm valve with a resilient spring 224 biasing the second valve 218 towards a second valve seat 222, causing the second valve 218 to be a normally closed valve.

The second valve 218 can open and close to control gas flow from the first flow chamber 208 to the second flow chamber 210. In some cases, the second valve 218 may be controlled by an electronic servo valve 226. The electronic servo valve 226 may control one or more pneumatic pressure paths that cause the second valve 218 to move away from the second valve seat 222 and to the open position. However, other means of controlling the opening and/or closing the second valve 218 are contemplated. The underside of the second valve 218 may be in fluid communication with the first flow chamber 208 and the gas inlet 202. The pressure of the gas underneath the second valve 218 may help (e.g., in combination with resilient spring 224) maintain the second valve 218 sealed against the second valve seat 222 when the gas valve 200 is off or no gas flow is desired. As can be seen in FIG. 4, when no gas flow is desired, the gas is confined to the first flow chamber 208 and up to the second valve 218.

The gas valve 200 is free from a pilot light system. In such an instance, a spark igniter (piezoelectric or automatic sparker) may be positioned in the main burner. In a low power environment (e.g., in the range of 10,000 BTU/hour or less), spark ignition may be sufficient to ignite the main burner. A thermopile may be used to generate power to operate the control of the water heater, and may be positioned directly in the main burner. In some instances, it may take the thermopile a length of time (e.g., in the range of 15 to 45 seconds) to heat sufficiently to power the control. As such it may be desirable, but not required, to provide the controller with a power source, such as a battery or super capacitor, that can keep the electronic servo valve 226 energized while the thermopile heats up. If such a power source is included in the control, then the user need not wait until the thermopile heats up for the control to work.

When gas flow is desired (e.g., heat to the water heater is called for), a controller may actuate the electronic servo valve 226 to cause the electronic servo valve 226 to open. As the electronic servo valve 226 opens, it can release gas from the underside of the second valve 218, down channel 230, through the pressure regulator 228, and into the second flow chamber 210 and the gas outlet 204. Gas pressure from the second flow chamber 210 can then act on the diaphragm of the second valve 218 to oppose the force of the resilient spring 224 and any remaining gas pressure on the underside of the second valve 218. As the gas begins to flow into the second flow chamber 210, the pressure on top of the second valve 218 may become greater than the pressure underneath the second valve 218. Once the pressure on top of the second valve 218 increases above the combined force provided by the resilient spring 224 and the pressure underneath the second valve 218, the second valve 218 is moved away from the second valve seat 222 under a pneumatic pressure to allow for a flow of gas from the first flow chamber 208 to the second flow chamber 210, as shown in FIG. 5.

In some cases, the gas valve 200 may be provided with one or more structures configured to allow for the use of a pilot assembly should one be desired. For example, the gas valve 200 may be provided with a first pilot channel 234 configured to receive a manual pilot valve 248 (see, for example, FIG. 6). When so provided, a manual pilot valve 248 may selectively direct a flow of gas from the first flow chamber 208, through a pilot by-pass channel 236. The pilot by-pass channel 236 may connect a flow of gas to a pilot pressure regulator 250 (see, for example, FIG. 6) through a second pilot channel 238. The pilot pressure regulator 250 may control a flow of gas to a pilot outlet 252 operably coupled to a pilot burner. When no pilot assembly is used, a ball bearing 240 or other plug may be inserted into the first pilot channel 234 to substantially block the first pilot channel 234, as shown in FIGS. 4 and 5. A continuous sealing material 242, such as, but not limited to a rubber material, may be placed over the entire outer surface of the valve body 220. The sealing material 242 may block any openings in the gas valve 200 that may allow gas to leak through in the absence of a pilot assembly and the structure required to control a flow gas to said pilot assembly. An opening 244 may be provided in the sealing material 242 to provide a vent hole for the regulator vent cap 246.

Figure 5:
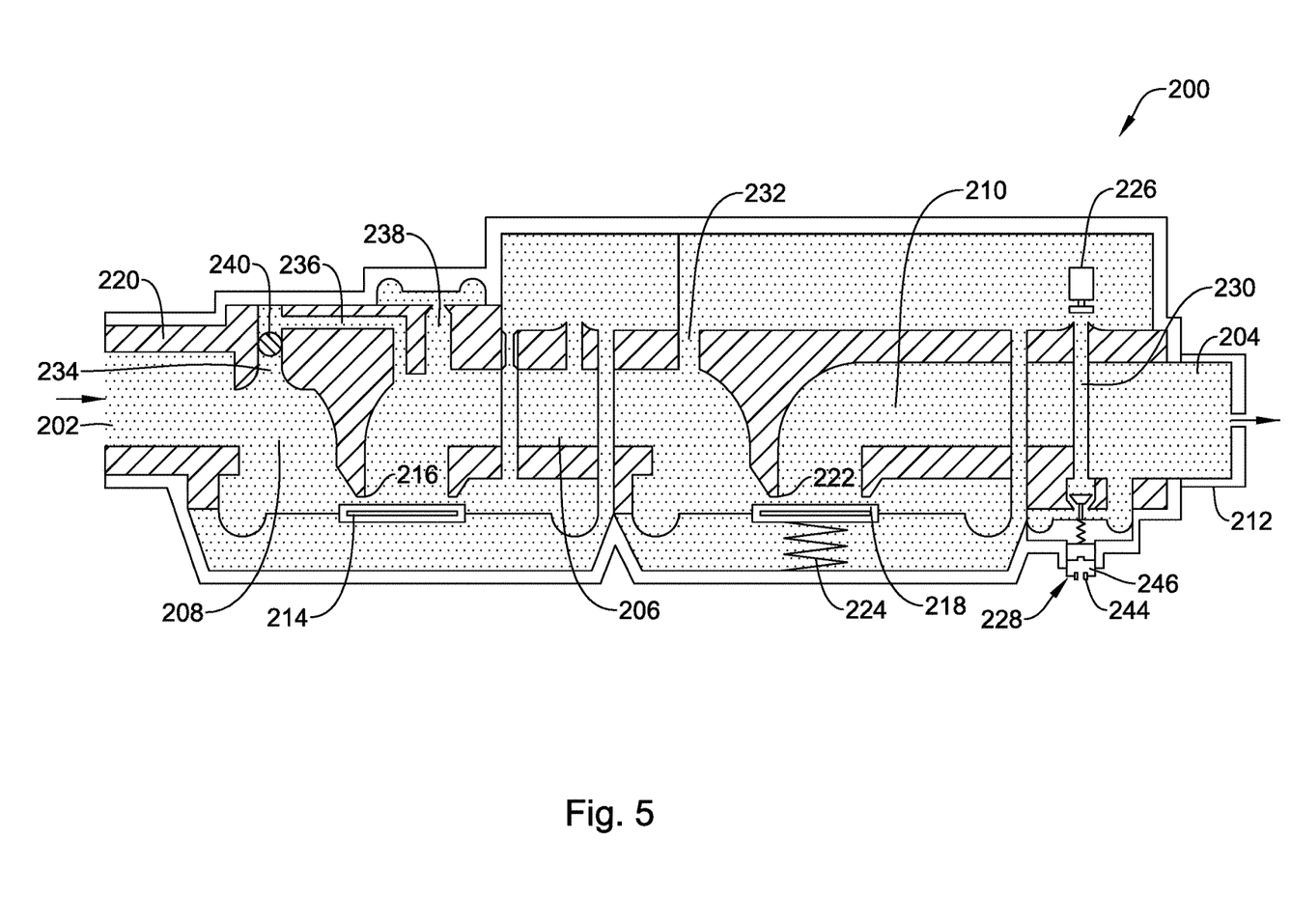
FIG. 5 is a schematic cross-sectional view of the illustrative gas valve of FIG. 4 in an on position.
Figure 6:
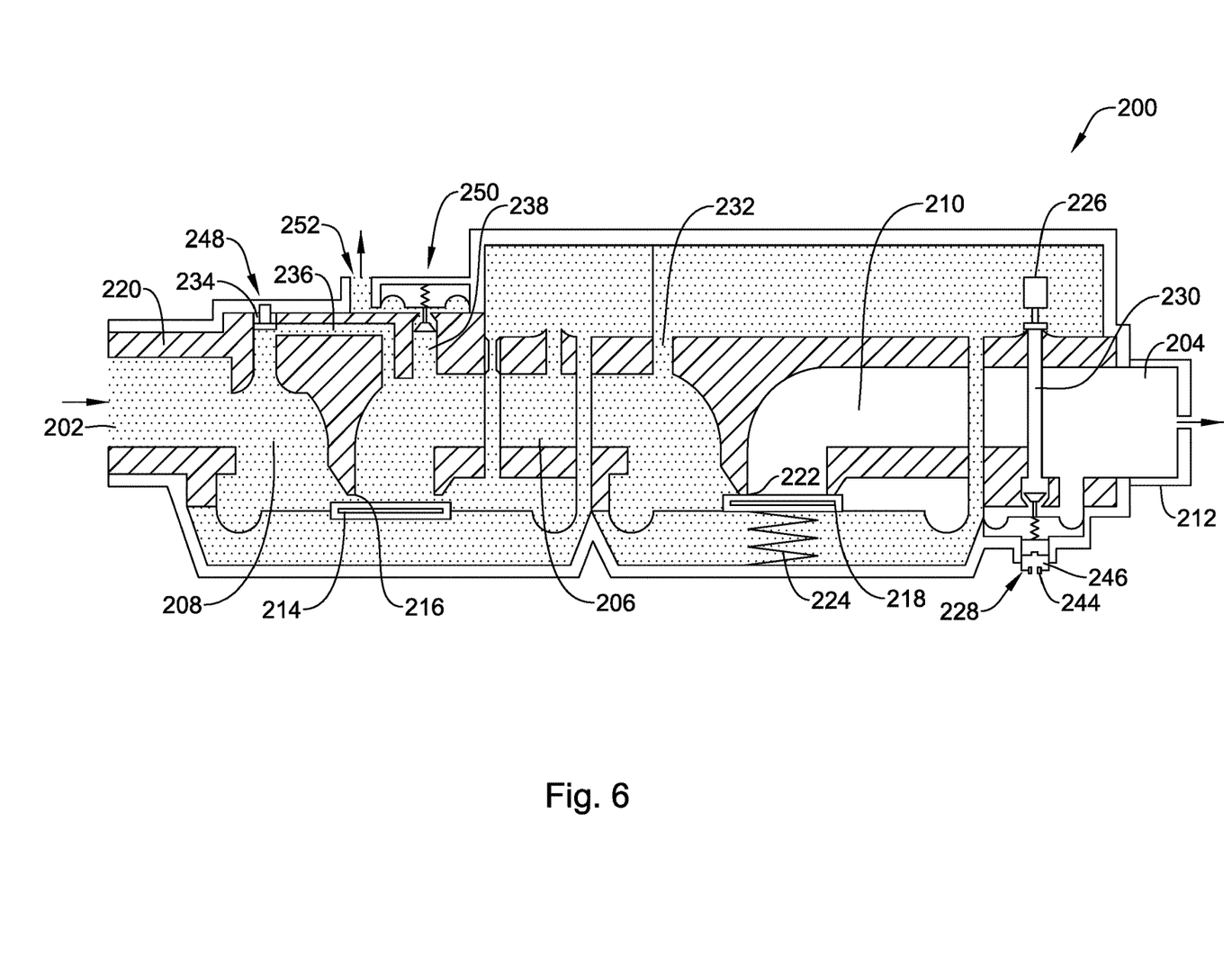
FIG. 6 is a schematic cross-sectional view of an illustrative gas valve of FIG. 4 having a pilot assembly.

As can be seen, the valve assembly of FIGS. 4-6 may include a single blocking valve (e.g., first valve 214). It is contemplated that the gas valve 200 may be used in a manually actuated system. In such a system, a user typically is required to open a manual gas valve connected to a propane tank (or other fuel source) upstream of the gas inlet 202. This manual gas valve acts as a first blocking valve (redundant valve), and the second valve 218 of the gas valve 200 acts as the second blocking valve to provide a redundant valve system.

Figure 7:
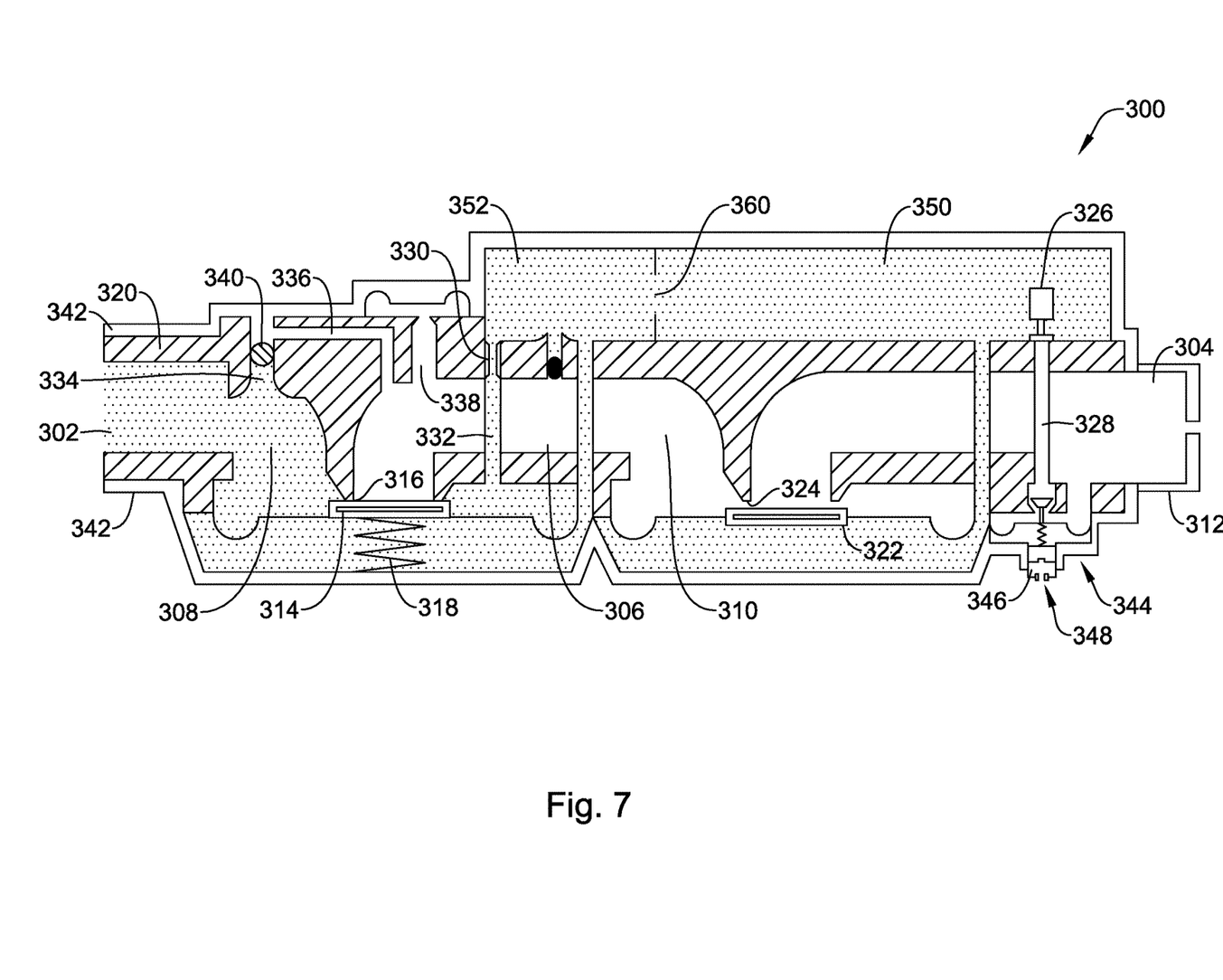
FIG. 7 is a schematic cross-sectional view of another illustrative gas valve in an off position.

FIG. 7 is a schematic cross-sectional view of an illustrative, but non-limiting gas valve 300, in a closed or off configuration. The illustrative gas valve 300 includes a valve body 320 that has a gas inlet 302, a gas outlet 304, and a conduit 306 connecting the gas inlet 302 and gas outlet 304. The valve body 320 may be a single piece molded or cast structure, although this is not required. The conduit 306 can include any number of flow chambers. However, in the illustrative embodiment shown, the conduit 306 includes a first flow chamber 308 and a second flow chamber 310. The first flow chamber 308 is in fluid communication with the gas inlet 302. The second flow chamber 310 is in fluid communication with the gas outlet 304. The second flow chamber 310 can be in selective fluid communication with the first flow chamber 308, as further described below. The gas outlet 304 may be configured to connect to a gas burner via a coupling 312.

A first valve 314 is disposed between the first flow chamber 308 and the second flow chamber 310. In the illustrative embodiment, the first valve 314 is a diaphragm valve with a resilient spring 318 biasing the first valve 314 towards a first valve seat 316 and causing the first valve 314 to be a normally closed valve. The second valve 322 is disposed in the second flow chamber 310 downstream from the first valve 314 such that the first and second valves 314, 322 are in series with one another. In the illustrative embodiment, the second valve 322 is a diaphragm valve free from or lacking a resilient spring, causing the second valve 322 to be spaced a distance from an adjacent second valve seat 324 and in an open position. The lack of a biasing element or spring may cause the second valve 322 to remain open or to be a normally open valve. While the gas valve 300 is illustrated as including a second valve 322 and diaphragm coupled to the second valve 322, it is contemplated that the second valve 322 and/or diaphragm may not be present.

The first valve 314 can open and close to control gas flow from the first flow chamber 308 to the second flow chamber 310. In some cases, the first valve 314 may be controlled by an electronic servo valve 326. However, other means of controlling the opening and/or closing the first valve 314 are contemplated. The underside of the first valve 314 may be in fluid communication with the gas inlet 302. The pressure of the gas underneath the first valve 314 may help (e.g., in combination with resilient spring 318) maintain the first valve 314 sealed against the first valve seat 316 when the gas valve 300 is off or no gas flow is desired. As can be seen in FIG. 7, when no gas flow is desired, the gas is confined to the first flow chamber 308. In some cases, an aperture or hole 360 may be provided between a first cavity 350 configured to receive the electronic servo valve 326 and a second cavity 352 configured to receive a second servo valve (not explicitly shown) should it be desired to control the position of the second valve 322.

The illustrative gas valve 300 is free from a pilot light system. In such an instance, a spark igniter (piezoelectric or automatic sparker) may be positioned in the main burner. In a low power environment (e.g., in the range of 10,000 BTU/hour or less), spark ignition may be sufficient to ignite the main burner. A thermopile may be used to generate power to operate the control of the water heater, and may be positioned directly in the main burner. In some instances, it may take the thermopile a length of time (e.g., in the range of 15 to 45 seconds) to heat sufficiently to power the control. As such it may be desirable, but not required, to provide the controller with a power source, such as a battery or super capacitor, that can keep the electronic servo valve 326 energized while the thermopile heats up. If such a power source is included in the control, then the user need not wait until the thermopile heats up for the control to work.

Figure 8:
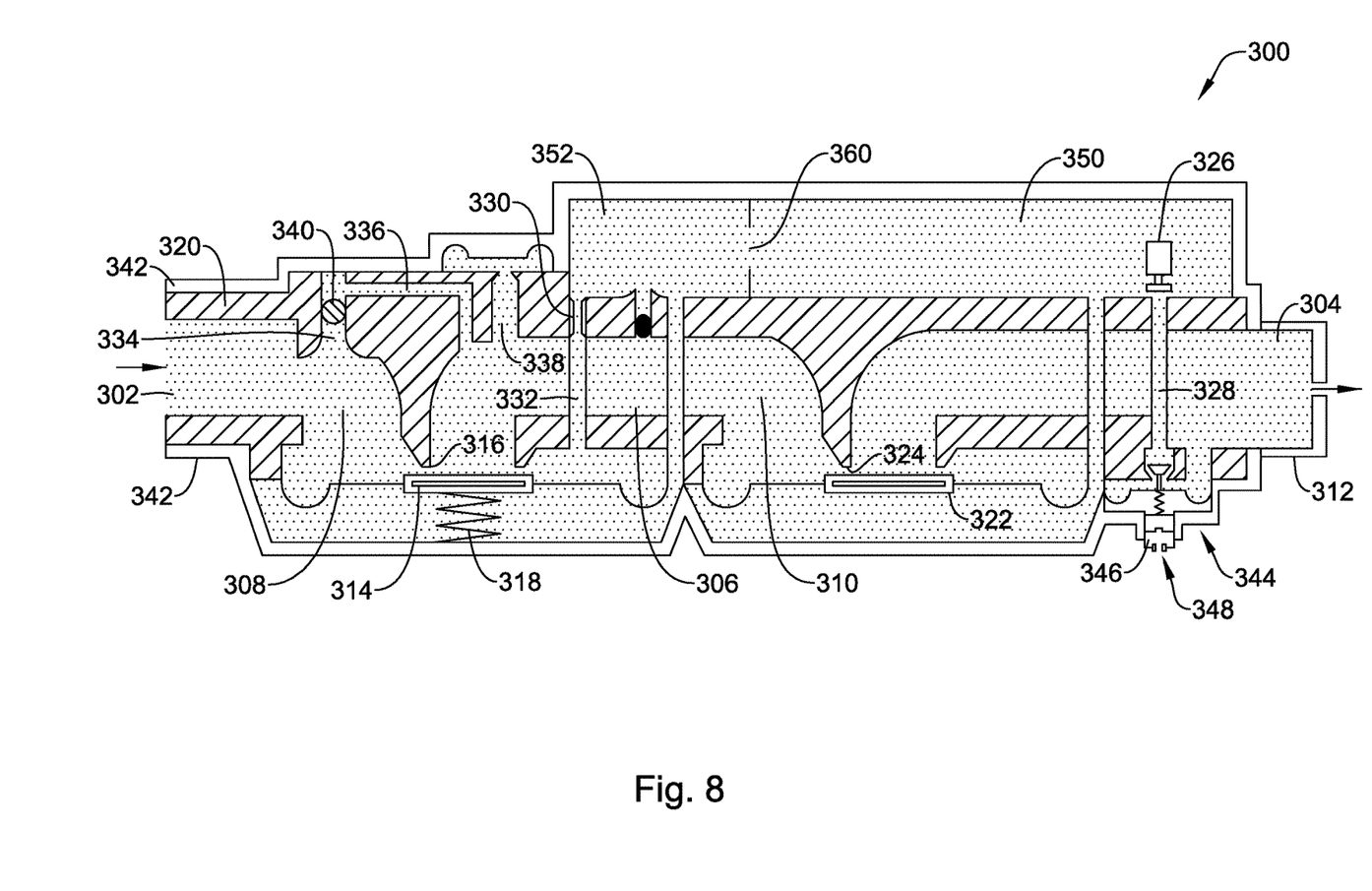
FIG. 8 is a schematic cross-sectional view of the illustrative gas valve of FIG. 7 in an on position.

When gas flow is desired (e.g., heat to the water heater is called for), a controller may actuate the electronic servo valve 326 to cause the electronic servo valve 326 to open. In some cases, a user may manually actuate the electronic servo valve 326 through a button or the like to cause the electronic servo valve 326 to open. Once the electronic servo valve 326 is open, gas may begin to flow into the second flow chamber 310 through a now open channel 328. A restrictor 330 may be provided in one or more channels, such as channel 332, to reduce the flow of gas in a particular flow direction. As the gas begins to flow into the second flow chamber 310, the pressure on top of the first valve 314 may become greater than the pressure underneath the first valve 314. Once the pressure on top of the first valve 314 increases above the combined force provided by the resilient spring 318 and the pressure underneath the first valve 314, the first valve 314 will move away from the first valve seat 316 under a pneumatic pressure, and allow for a flow of gas from the first flow chamber 308 to the second flow chamber 310, as shown in FIG. 8. An outlet pressure regulator 344 may regulate the pressure of the gas exiting the gas valve 300.

In some cases, the gas valve 300 may be provided with one or more structures that are configured to allow for the use of a pilot assembly. For example, the gas valve 300 may be provided with a first pilot channel 334 configured to receive a manual pilot valve. When so provided, a manual pilot valve may selectively direct a flow of gas from the first flow chamber 308, through a pilot by-pass channel 336. The pilot by-pass channel 336 may connect a flow of gas to a pilot pressure regulator (not explicitly shown) through a second pilot channel 338. While not explicitly shown, the pilot pressure regulator may control a flow of gas to a pilot outlet operably coupled to a pilot burner. A ball bearing 340 or other plug may be inserted into the first pilot channel 334 to substantially block the first pilot channel 334 when a pilot assembly is not used. A continuous sealing material 342, such as, but not limited to a rubber material, may be placed over the entire outer surface of the valve body 320. The sealing material 342 may block any openings in the gas valve 300 that may allow gas to leak through in the absence of a pilot assembly and the structure required to control a flow gas to said pilot assembly. An opening 348 may be provided in the sealing material 342 to provide a vent hole for the regulator vent cap 346.

As can be seen, the valve assembly of FIGS. 7 and 8 may include a single blocking valve (e.g., first valve 314). It is contemplated that the gas valve 300 may be used in a manually actuated system. In such a system, a user typically is required to open a manual gas valve connected to a propane tank (or other fuel source) upstream of the gas inlet 302. This manual gas valve acts as a first blocking valve (redundant valve), and the first valve 314 of the gas valve 300 acts as the second blocking valve to provide a redundant valve system.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

We claim:

1. A gas valve assembly, comprising:
   a gas inlet;
   a gas outlet;
   a gas fluid path defined between the gas inlet and the gas outlet;
   a first valve seat situated in the gas fluid path between the gas inlet and the gas outlet;
   a second valve seat situated in the gas fluid path between the gas inlet and the gas outlet in series with the first valve seat;
   a first diaphragm valve configured to be responsive to one or more pneumatic pressures to move between a closed position where the first diaphragm valve is sealed against the first valve seat and an open position wherein the first diaphragm valve is spaced away from the first valve seat, the first diaphragm valve being biased toward the closed position by a spring;
   a second diaphragm valve positioned adjacent the second valve seat wherein the second diaphragm valve is spaced away from the second valve seat, wherein the second diaphragm valve is not biased toward the second valve seat by a spring; and
   a servo valve that, when activated, controls one or more pneumatic paths to move the first diaphragm valve away from the first valve seat and to allow a flow of gas between the gas inlet and the gas outlet.

2. The gas valve assembly of claim 1, wherein the first valve seat is upstream of the second valve seat.

3. The gas valve assembly of claim 1, wherein the first valve seat is downstream of the second valve seat.

4. The gas valve assembly of claim 1, wherein the flow path has a first flow chamber and a second flow chamber.

5. The gas valve assembly of claim 4, wherein when in the closed configuration, the first diaphragm valve fluidly isolates the first flow chamber from the second flow chamber.

6. The gas valve assembly of claim 4, wherein the one or more pneumatic paths comprises a channel extending between the first flow chamber and the second flow chamber, and wherein the servo valve, when activated, opens the channel.

7. The gas valve assembly of claim 1, wherein the gas inlet and the gas outlet are fluidly isolated from one another except when the first diaphragm valve is in the open position.

8. The gas valve assembly of claim 1, further comprising a sealing material disposed over an outer surface of a body of the valve assembly.

9. A gas valve assembly, comprising:
   a single piece housing defining:
      a gas inlet;
      a gas outlet;
      a first valve seat between the gas inlet and the gas outlet;
      a second valve seat between the gas inlet and the gas outlet in series with the first valve seat;
   a first diaphragm valve configured to be responsive to one or more pneumatic pressures to move between a closed position where the first diaphragm valve is sealed against the first valve seat and an open position wherein the first diaphragm valve is moved away from the first valve seat; and
   a servo valve that, when activated, controls one or more pneumatic paths to move the first diaphragm valve away from the first valve seat and to allow a flow of gas between the gas inlet and the gas outlet, wherein the gas inlet and the gas outlet are fluidly isolated from one another except when the first diaphragm valve is in the open position.

10. The gas valve assembly of claim 9, wherein the first valve seat is upstream of the second valve seat.

11. The gas valve assembly of claim 9, wherein the first valve seat is downstream of the second valve seat.

12. The gas valve assembly of claim 9, wherein the first diaphragm valve is biased toward the closed position by a spring.

13. The gas valve assembly of claim 9, further comprising a sealing material disposed over an outer surface of a body of the valve assembly.

14. A gas valve assembly, comprising:
a gas inlet;
a gas outlet;
a gas fluid path defined between the gas inlet and the gas outlet, the gas fluid path having a first flow chamber and a second flow chamber;
a first valve seat situated in the gas fluid path between the gas inlet and the gas outlet;
a first diaphragm valve configured to be responsive to one or more pneumatic pressures to move between a normally closed position where the first diaphragm valve is sealed against the first valve seat and an open position wherein the first diaphragm valve is moved away from the first valve seat; and
a servo valve that, when activated, controls the one or more pneumatic paths to move the first diaphragm valve away from the first valve seat and to allow a flow of gas between the gas inlet and the gas outlet,
wherein the gas inlet and the gas outlet are fluidly isolated from one another at all times except when the first diaphragm valve is in the open position.

15. The gas valve assembly of claim 14, wherein the first valve seat is upstream of the second flow chamber.

16. The gas valve assembly of claim 14, wherein first diaphragm valve is configured to fluidly isolate the first flow chamber from the second flow chamber.

17. The gas valve assembly of claim 14, further comprising a second diaphragm valve positioned adjacent to a second valve seat and downstream of the first diaphragm valve, wherein the second diaphragm valve is spaced away from the second valve seat, wherein the second diaphragm valve is not biased toward the second valve seat by a spring.

18. The gas valve assembly of claim 14, further comprising a second diaphragm valve positioned adjacent to a second valve seat and upstream of the first diaphragm valve, wherein the second diaphragm valve is spaced away from the second valve seat, wherein the second diaphragm valve is not biased toward the second valve seat by a spring.

\* \* \* \* \*